US012784419B2

(12) United States Patent
Luo et al.

(10) Patent No.: US 12,784,419 B2
(45) Date of Patent: Nov. 3, 2026

(54) MODEL TRAINING AND SCENE RECOGNITION METHOD AND APPARATUS, DEVICE, AND MEDIUM

(71) Applicant: BIGO TECHNOLOGY PTE. LTD., Mapletree Business City (SG)

(72) Inventors: Xiongwen Luo, Guangzhou (CN); Jianghu Lu, Guangzhou (CN); Wei Xiang, Guangzhou (CN)

(73) Assignee: BIGO TECHNOLOGY PTE. LTD., Mapletree Business City (SG)

(*) Notice: Subject to any disclaimer, the term of this patent is extended or adjusted under 35 U.S.C. 154(b) by 289 days.

(21) Appl. No.: 18/697,893

(22) PCT Filed: Sep. 30, 2022

(86) PCT No.: PCT/CN2022/123011
§ 371 (c)(1),
(2) Date: Apr. 2, 2024

(87) PCT Pub. No.: WO2023/056889
PCT Pub. Date: Apr. 13, 2023

(65) Prior Publication Data

US 2025/0239057 A1 Jul. 24, 2025

(30) Foreign Application Priority Data

Oct. 9, 2021 (CN) .......................... 202111174534.2

(51) Int. Cl.
*G06V 10/774* (2022.01)
*G06V 10/77* (2022.01)
(Continued)

(52) U.S. Cl.
CPC ...... *G06V 10/7747* (2022.01); *G06V 10/7715* (2022.01); *G06V 10/776* (2022.01);
(Continued)

(58) Field of Classification Search
CPC ............... G06V 10/7747; G06V 20/70; G06V 10/7715; G06V 10/82; G06V 10/7792;
(Continued)

(56) References Cited

U.S. PATENT DOCUMENTS 10,504,539 B2 * 12/2019 Kaskari .................. G10L 25/78
11,617,008 B1 * 3/2023 Gupta .................... G06N 3/048 725/9
(Continued)

FOREIGN PATENT DOCUMENTS

CN 106203354 A 12/2016
CN 110046656 A 7/2019
(Continued)

OTHER PUBLICATIONS

Lv et al., 2019, "An End-to-End Local-Global-Fusion Feature Extraction Network for Remote Sensing Image Scene Classification" (pp. 1-20) (Year: 2019).*
(Continued)

*Primary Examiner* — Manav Seth
(74) *Attorney, Agent, or Firm* — Dilworth & Barrese, LLP.; Michael J. Musella, Esq.

(57) ABSTRACT

Provided is a method for training a scene recognition model. The scene recognition model includes a core feature extraction layer, a global information feature extraction layer, an LCS module of at least one level with an attention mechanism, and a fully-connected decision layer. The method includes: acquiring parameters of the core feature extraction layer and the global information feature extraction layer by training based on a first scene label of a sample image and a standard cross-entropy loss; training a weight parameter of the LCS module of each level, based on a loss value acquired by performing a pixel-by-pixel calculation on a feature map output from the LCS module of each level and the first scene
(Continued)

label of the sample image; and acquiring a parameter of the fully-connected decision layer by training based on the first scene label of the sample image and the standard cross-entropy loss.

18 Claims, 9 Drawing Sheets

(51) Int. Cl.
*G06V 10/776* (2022.01)
*G06V 10/778* (2022.01)
*G06V 10/82* (2022.01)
*G06V 20/70* (2022.01)

(52) U.S. Cl.
CPC .......... *G06V 10/7792* (2022.01); *G06V 10/82* (2022.01); *G06V 20/70* (2022.01)

(58) Field of Classification Search
CPC .. G06V 10/776; G06V 10/806; G06V 10/454; G06V 10/764; G06F 18/214; Y02T 10/40; G06N 3/084; G06N 3/08; G06N 3/04; G06N 3/045; G06N 3/048
See application file for complete search history.

(56) References Cited

U.S. PATENT DOCUMENTS

| | | | | |
|---|---|---|---|---|
| 2020/0012923 | A1 | 1/2020 | Ghosh et al. | |
| 2020/0210773 | A1* | 7/2020 | Li | G06N 3/047 |
| 2020/0342360 | A1 | 10/2020 | Chen et al. | |
| 2021/0097278 | A1* | 4/2021 | Liu | G06T 7/90 |

FOREIGN PATENT DOCUMENTS

| | | | | |
|---|---|---|---|---|
| CN | 112926429 | A | 6/2021 | |
| CN | 114049584 | A | 2/2022 | |
| WO | WO-2018065158 | A1 * | 4/2018 | G06V 20/53 |

OTHER PUBLICATIONS

International search report of PCT application No. PCT/CN2022/123011 issued on Dec. 22, 2022.
China National Intellectual Property Administration, First office action of Chinese application No. 202111174534.2 issued on Oct. 16, 2024, which is foreign counterpart application of this US application.
Sheng Guo et al., Locally Supervised Deep Hybrid Model for Scene Recognition, IEEE Transactions on Image Processing, vol. 26, Issue 2, Feb. 28, 2017, Sections 2-4.
Limin Wang et al., Knowledge Guided Disambiguation for Large-Scale Scene Classification With Multi-Resolution CNNs, IEEE Transactions on Image Processing, vol. 26, Issue 4, Apr. 30, 2017, Sections 2-5.
Zhao Zengqun et al., Learning Deep Global Multi-Scale and Local Attention Features for Facial Expression Recognition in the Wild, IEEE Transactions on Image Processing, IEEE, USA, vol. 30, Jul. 5, 2021, pp. 6544-6556, ISSN: 1057-7149, DOI: 10.1109/TIP.2021.3093397, the whole document.
Elham Eslami et al., Attention-Based Multi-Scale Convolutional Neural Network (A+MCNN) for Multi-Class Classification in Road Images, SENSORS, vol. 21, No. 15, Jul. 29, 2021, p. 5137, ISSN: 1424-8220, DOI: 10.3390/s21155137, the whole document.
Extended European Search Report in European Application No. 22877908.8 dated Sep. 15, 2025.

* cited by examiner

MODEL TRAINING AND SCENE RECOGNITION METHOD AND APPARATUS, DEVICE, AND MEDIUM

CORRS-REFERENCE TO RELATED APPLICATION

This application is a U.S. national stage of international application No. PCT/CN2022/123011, field on Sep. 30, 2022, which claims priority to Chinese Patent Application No. 202111174534.2, filed on Oct. 9, 2021, the contents of which are herein incorporated by reference in their entireties.

TECHNICAL FIELD

The present disclosure relates to the technical field of image processing, and in particular, relates to a model training and scene recognition method, an apparatus, a device, and a medium.

BACKGROUND

Machine moderation techniques (referred to as machine review) are increasingly used in large-scale short video/image moderation, where the offensive images are determined by the machine moderation are then pushed to staff members for moderation (referred to as manual review), which ultimately determines whether or not the images are offensive. The emergence of machine moderation has greatly improved the efficiency of image moderation. However, the machine moderation tends to make an offense judgment by relying on the visual commonality of images, which ignores the changes in moderation results due to changes in the general environment. For example, in the case of gun offense, when the machine moderation recognizes the presence of a gun in an image, the image will generally be considered offensive, but the accuracy of such a machine moderation result is poor. This is because, for example, where the gun appears in an anime or game scene, the image is not offensive. Therefore, scene recognition is critical to the accuracy of the machine moderation results, and a scene recognition scheme is urgently desired.

SUMMARY

Embodiments of the present disclosure provide a model training and scene recognition method, an apparatus, a device, and a medium.

According to some embodiments of the present disclosure, a method for training a scene recognition model is provided. The scene recognition model includes a core feature extraction layer, a global information feature extraction layer connected to the core feature extraction layer, a local supervised learning (LCS) module of at least one level with an attention mechanism, and a fully-connected decision layer. The method includes:

- acquiring parameters of the core feature extraction layer and the global information feature extraction layer by training based on a first scene label of a sample image and a standard cross-entropy loss;
- training a weight parameter of the LCS module of each level, based on a loss value acquired by performing a pixel-by-pixel calculation on a feature map output from the LCS module of each level and the first scene label of the sample image; and

- acquiring a parameter of the fully-connected decision layer by training based on the first scene label of the sample image and the standard cross-entropy loss.

According to some embodiments of the present disclosure, a scene recognition method for a scene recognition model acquired by training according to the method as described above is provided. The method includes:

- acquiring an image to be recognized; and
- inputting the image to be recognized into a pre-trained scene recognition model and determining scene information corresponding to the image to be recognized based on the scene recognition model.

According to some embodiments of the present disclosure, an electronic device is provided. The electronic device includes a processor and a memory, the memory storing one or more computer programs therein. The processor, when loading and running the one or more computer programs stored in the memory, is caused to perform the steps of the method for training the scene recognition model as described above, or the steps of the scene recognition method as described above.

According to some embodiments of the present disclosure, a non-transitory computer-readable storage medium, storing one or more computer programs therein is provided. The one or more computer programs, when loaded and run by a processor, cause the processor to perform the steps of the method for training the scene recognition model as described above, or the steps of the scene recognition method as described above.

Some embodiments of the present disclosure provide a model training and scene recognition method, an apparatus, a device, and a medium. The scene recognition model includes a core feature extraction layer, a global information feature extraction layer connected to the core feature extraction layer, a local supervised learning LCS module of at least one level with an attention mechanism, and a fully-connected decision layer. The method includes:

- acquiring parameters of the core feature extraction layer and the global information feature extraction layer by training based on a first scene label of a sample image and a standard cross-entropy loss;
- training a weight parameter of the LCS module of each level, based on a loss value acquired by performing a pixel-by-pixel calculation on a feature map output from the LCS module of each level and the first scene label of the sample image; and
- acquiring a parameter of the fully-connected decision layer by training based on the first scene label of the sample image and the standard cross-entropy loss.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

Figure 1:
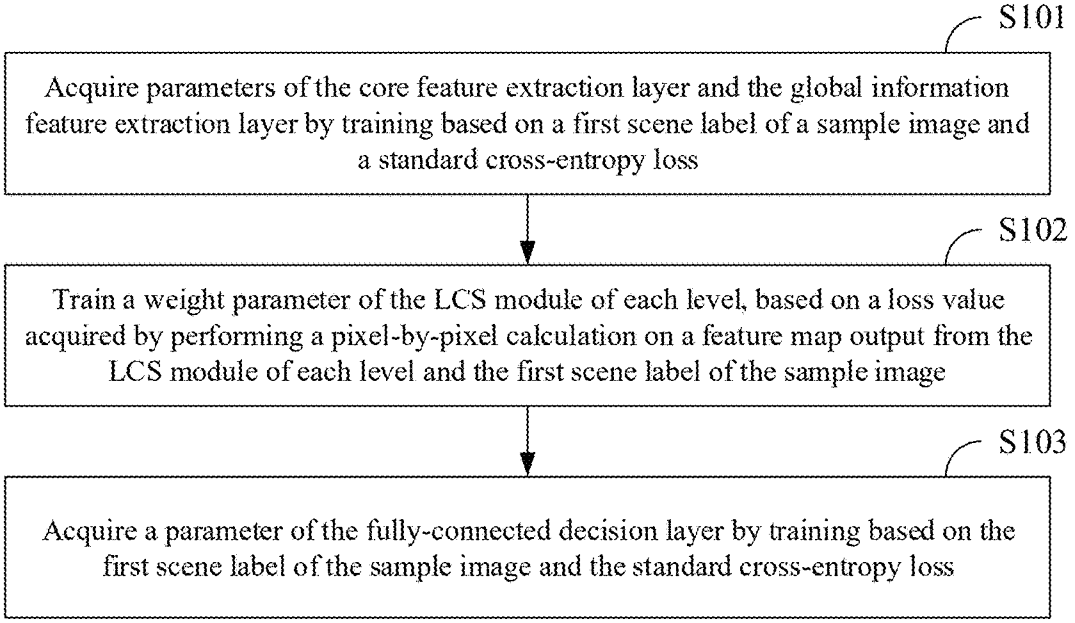
FIG. 1 is a schematic diagram of a training process of a scene recognition model according to some embodiments of the present disclosure.

The present disclosure is described hereinafter in conjunction with the accompanying drawings, and the described embodiments are only a portion of the embodiments of the present disclosure and not all of the embodiments. Based on the embodiments in this disclosure, all other embodiments acquired by those skilled in the art without creative efforts fall within the scope of protection of this disclosure.

The specialized acronyms or custom terms involved in the embodiments of the present disclosure are explained hereinafter.

Convolutional Neural Network: an end-to-end complex mapping for extracting image or video features and completing, based on the extracted features, visual tasks such as classification and detection, which typically consists of a stack of multiple base convolutional modules.

Convolutional Layer: an operation layer that performs weighted summation and feature extraction using kernel images with specific receptive fields, which is typically also combined with a nonlinear activation function to improve mapping capabilities.

Pooling: a summing operation, such as summing pixel values of a specific range or a specific dimension, typically including maximizing, minimizing, averaging, and the like.

Grouped Convolution: organizing feature map groups into several sub-groups by channel, where each sub-group of feature maps performs the same or different convolution operations, which is used to reduce calculation overhead.

Feature Pyramid: a multi-scale feature extraction method that typically extracts feature maps from different levels of a network, then aligns the feature maps with a certain up-sampling scheme and produces multi-scale features by fusing these feature maps.

Residual Block: a module consisting of multiple convolutional layers with cross-layer connection bypass, using which deeper convolutional neural networks can be built and the phenomenon of gradient vanishing can be avoided, accelerating the training of the network.

Heat Map: a feature map that reflects the local importance of an image, generally the higher the importance, the higher the local heat value, or vice versa.

Local Supervised Learning: learning of parameters or extraction capabilities for some parts of the model or a local part of the feature map using directly connected labels and losses.

Attention Mechanism: a mechanism that forces the network to focus on important regions by fitting important levels of different parts and to make decisions based on features of the important regions.

Sigmoid: an activation function that does not take into account, category mutual exclusive relationship, and usually output values after being activated fall in the interval [0, 1] to complete normalization.

Deformable Convolution: a convolution operation in which a convolution kernel is not a canonical geometry, and the non-canonical geometry is usually generated from the original shape plus an offset.

Standard Cross Entropy: a conventional loss evaluation function for simple classification problems, commonly used to train classification networks, including single-label classification and multiple-label classification.

Focal Loss: a loss function for category imbalance problems that allows categories with less data to receive larger penalties, preventing the model from completely favoring categories with more data.

It should be noted that the embodiments of the present disclosure are not directly applied to the machine moderation session to directly generate moderation results; rather, the scenario information required by the specific machine moderation model is output in the form of scenario signals, and push results are generated together by an appropriate strategy and the machine moderation model. The videos or pictures considered to be offensive by the final push result will be pushed to the manual moderation session for multiple rounds of moderation to obtain the penalty result; while the videos or pictures considered to be normal by the final push result will also be sampled and inspected in different regions according to a sampling rate, or pushed to the manual moderation session for moderation based on the reporting result to avoid omitting videos/pictures that are in serious violation.

Embodiment 1

FIG. 1 is a schematic diagram of a training process of a scene recognition model according to some embodiments of the present disclosure. The process includes the following steps.

In S101, parameters of a core feature extraction layer and a global information feature extraction layer are acquired by training based on a first scene label of a sample image and a standard cross-entropy loss.

In S102, a weight parameter of an LCS module of each level is trained based on a loss value acquired by performing a pixel-by-pixel calculation on a feature map output from the LCS module of each level and the first scene label of the sample image.

In S103, a parameter of a fully connected decision layer is acquired by training based on the first scene label of the sample image and standard cross-entropy loss.

The scene recognition model includes the core feature extraction layer, the global information feature extraction layer connected to the core feature extraction layer, the LCS modules of each level, and the fully connected decision layer.

The scene recognition method according to some embodiments of the present disclosure is applied to an electronic device, which is a smart device such as a personal computer (PC), a tablet computer, or a server.

To adapt to the requirements of different fine-grained scene recognition, in the embodiments of the present disclosure, the scene recognition model further includes a branch expansion structure. The branch expansion structure includes a convolutional layer and a local object association relationship module.

A weight parameter of the convolutional layer of each level of the branch expansion structure is trained based on a loss value acquired by performing a pixel-by-pixel calculation on feature maps output from the convolutional layers of the branch expansion structure and a second scene label of the sample image, and a parameter of the local object association relationship module is acquired by training based on a loss function with a scene confidence regularization term. The first scene label and the second scene label have different granularities.

Generally, the first scene label is a coarse-grained scene label and the second scene label is a fine-grained scene label.

Figure 2:
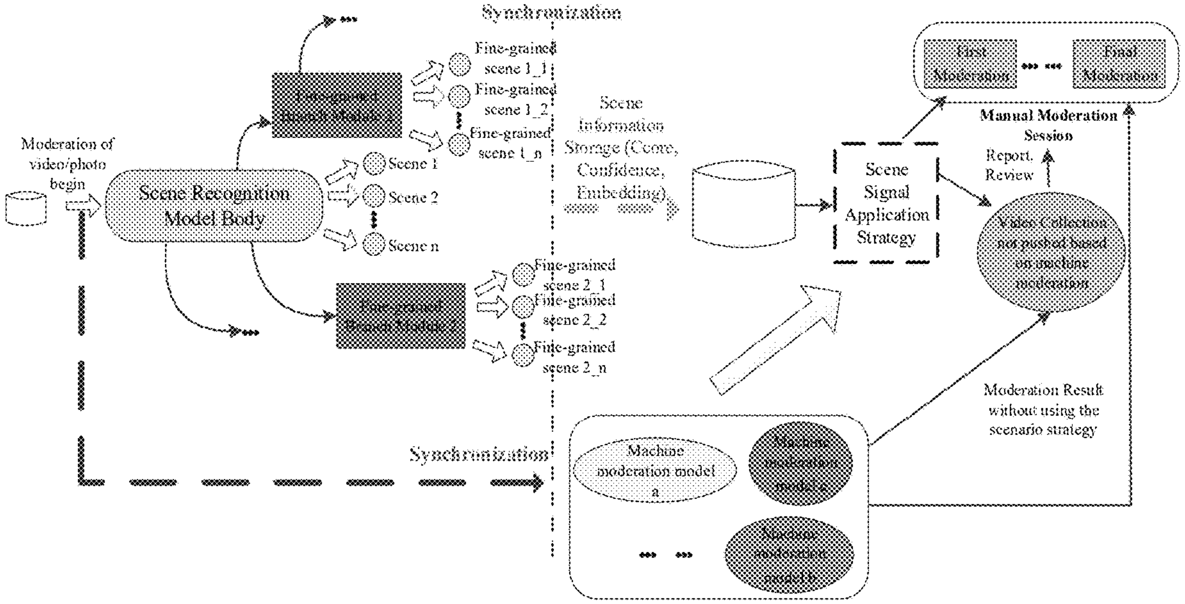
FIG. 2 is a schematic diagram of application of a scene recognition method according to some embodiments of the present disclosure.

As shown in FIG. 2, the multi-level fine-grained scene recognition model according to the embodiments of the present disclosure operates synchronously. That is, for an image to be recognized in a video set or a picture set, this model will be performed first in preference to other existing machine moderation models in the machine moderation process, stores the acquired scene information in a cache queue; then activate, by synchronization signals, a series of machine moderation models (the machine moderation model a, the machine moderation model b, and the machine moderation model c in FIG. 2), and runs the machine moderation models with the image to be recognized in the same video set or picture set as inputs, and then a preliminary push moderation result is acquired. The machine moderation model/label configured with the scene strategy extracts the corresponding scene signals from the cache queue, acquires the final push moderation result by calculating the scene signals together with the preliminary push moderation result of the machine moderation, and decides whether to push the final result to the manual moderation session. While the machine moderation model/label not configured with the scene strategy decides whether to push or not directly based on the result given by the machine moderation model.

Where scene information corresponding to the to-be-recognized image is determined to be offensive scene information, and the moderation result of the machine moderation is that the to-be-recognized image is an offensive image, then it is determined that the to-be-recognized image is an offensive image, and it is decided to be pushed to the manual moderation session. Where it is determined that the scene information corresponding to the to-be-recognized image does not belong to the offensive scene information, or the moderation result of the machine moderation is that the to-be-recognized image is not an offensive image, it is determined that the to-be-recognized image is not an offensive image, and at this time, it is not pushed to the manual moderation session, or it is sampled and reviewed in different regions in accordance with a sampling rate, or it is pushed to the manual moderation session for re-examination based on a report result.

The electronic device is capable of storing in advance information about which scene information belongs to the offensive scene information. Therefore, after the scene information corresponding to the to-be-recognized image is determined, the electronic device is capable of determining whether the scene information corresponding to the to-be-recognized image belongs to the offensive scene information. The process in which the machine moderation model moderates whether the to-be-recognized image is an offensive image is performed using the related art, which is not repeated herein.

Figure 3:
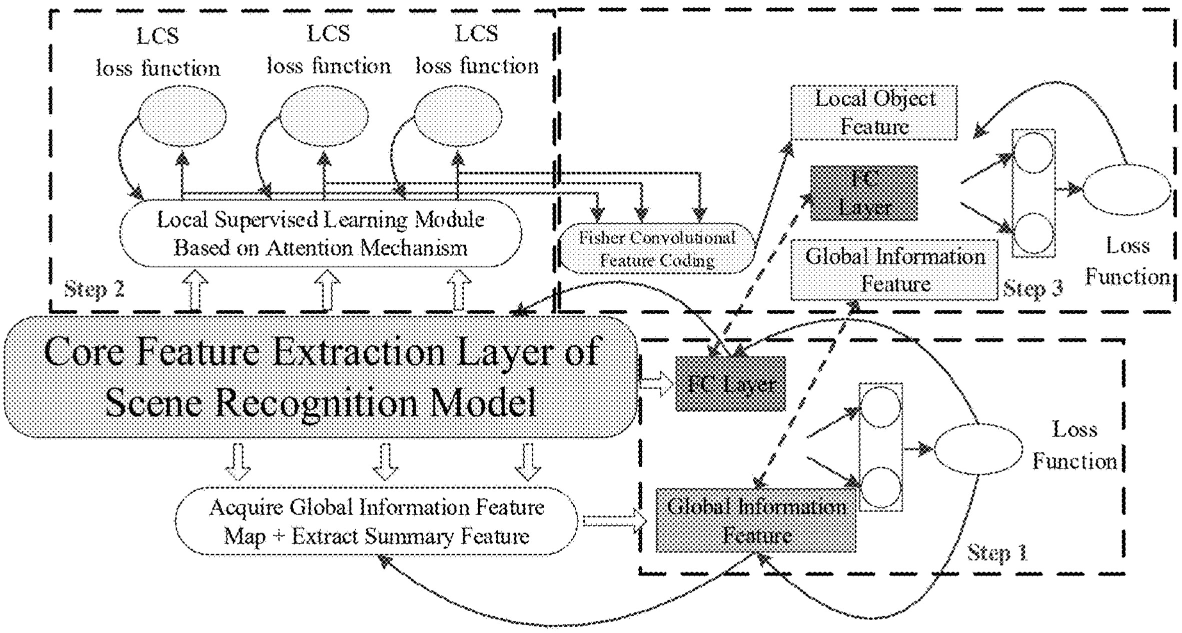
FIG. 3 is a flowchart of a model body training phase according to some embodiments of the present disclosure.
Figure 4:
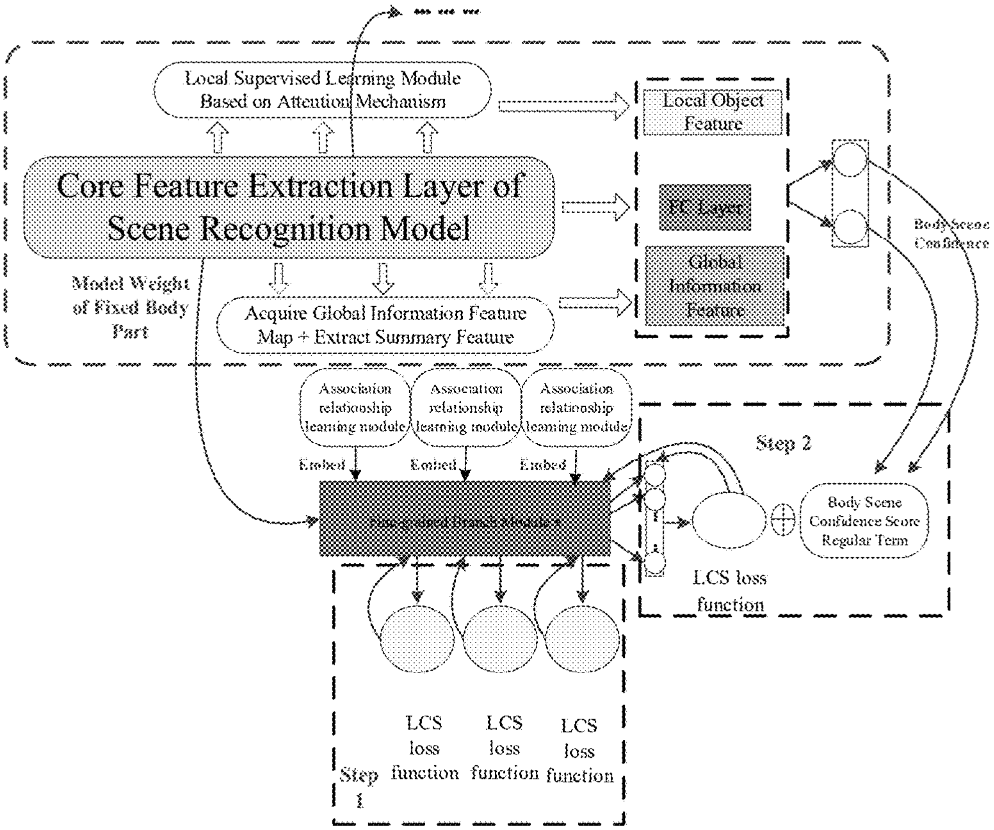
FIG. 4 is a flowchart of a model branch expansion phase according to some embodiments of the present disclosure.

FIG. 3 is a flowchart of a training process of a body structure of a scene recognition model according to some embodiments of the present disclosure. FIG. 4 is a flowchart of a training process of a branch expansion structure of a scene recognition model according to some embodiments of the present disclosure.

FIGS. 3 and 4 illustrate an overall training process of the multi-level fine-grained scene recognition model according to some embodiments of the present disclosure, which consists of two phases, namely, "a model body training phase" and "a model branch expansion phase." After the training is completed, a scene recognition model as shown in the left side of FIG. 2 is generated, which is used to improve the accuracy of the machine moderation model. For the scene recognition model, the feature extraction capability of the body structure part is very important, because each component of the body structure part is generally used as a front component of the branch expansion structure, which affects the feature extraction capability of the specific fine-grained branches. In order to significantly improve the feature extraction ability of the body structure part of the model, so that it can mine high-richness features, as shown in FIG. 3, in the model body training phase, the modules of the body structure part are trained by three rounds of training strategies with different target objectives. In the first round, the core feature extraction layer and multi-scale global information feature extraction layer of the scene recognition model are specifically optimized by the first scene label (which is generally a picture-level scene semantic label in this case) and the standard cross-entropy loss after many iterations, and the weight parameter of the local supervised learning module is not optimized at first. The main purpose of the first round of optimization is to allow the model to acquire the ability to extract abstract semantic features and multi-scale global features. Then, the parameter (weight parameter) of the first round of optimization is fixed, and each pooled convolutional feature map group is connected to a local supervised learning module with an attention mechanism (LCS module). The pooled convolutional feature map group is used as the input for each level, and after being processed by the LCS module, the model outputs an image of the pooled convolutional feature map as the input. After the LCS module, a "focused" feature map is output. The weight parameter of the LCS module of each level is optimized with a pixel-by-pixel binary sigmoid loss based on this feature map and the first scene label of the sample image (which is usually a label at a block diagram level at this time). After the second round of optimization is completed, the model is sensitive to a local object feature, which is extracted by the LCS module and coded by a Fisher convolutional feature, and the feature redundancy is reduced while the absence of subtle features that have a decision impact is minimized. The third round of optimization focuses on a decision layer weight parameter for the fused feature, at which point the fully connected output layer used in the first round of optimization is removed and replaced with a fully connected decision layer corresponding to the fusion of three features, which is trained and optimized by the first scene label (which at this point is typically a picture-level semantic scene label) and the standard cross-entropy loss, with the weight parameters other than those of the decision layer fixed.

After the model body training phase is completed, the model is expanded with branches on the body structure based on subsequent fine-grained scene requirements. FIG. 4 gives an example of expanding a branch. Typically, the branch starts from an output of one of the convolutional layers in the body structure part, accesses several convolutional pooling operation layers, the weight parameter of the body structure part is fixed during the training, and the training is completed after two rounds of optimization. The first round of optimization directly optimizes the associated convolutional layer by using a pixel-by-pixel binary sigmoid loss, and no longer uses the LCS module as a relay. The main purpose of the first round of optimization is also to make the expansion branch have a feature learning capability on the local object. The second round of optimization embeds some "local object association learning modules" consisting of "deformed convolutions" in the expansion branch, and learns the mining capability of the local object association relationship by the focus loss with the scene confidence regularization term on the basis that the branch already has the capability of local object feature extraction. Using a similar approach, a plurality of different branches are expanded on the body network to handle different task requirements.

Some embodiments of the present disclosure provide a scheme for image scene recognition based on a scene recognition model. In training the scene recognition model, firstly, the parameters of the core feature extraction layer and the global information feature extraction layer are acquired by training based on the first scene label of the sample image and the standard cross-entropy loss, and then, based on the loss value acquired by performing the pixel-by-pixel calculation on the feature map output by the LCS module of each level and the first scene label of the sample image, the weight parameter of the LCS module of each level is trained, and finally, the parameter of the fully-connected decision layer of the scene recognition model is acquired by training. In this way, the scene recognition model is made to have the ability to extract high-richness features, and the accuracy of scene recognition is substantially improved by performing the scene recognition based on the scene recognition model. Moreover, the scene recognition model further includes the branch expansion structure, thereby adapting to the requirements of different fine-grained scene recognition.

As can be seen from FIG. 4, the core feature extraction layer in the scene recognition model is connected to the global information feature extraction layer, the LCS module of each level, the fully connected decision Layer (FC Layer in FIG. 4), and the branch expansion structure. During performing the scene recognition on an image to be recognized based on the scene recognition model, the core feature extraction layer firstly extracts features from the image to be recognized, and then outputs the results to the global information feature extraction layer, the LCS module of each level, the FC Layer, and the branch expansion structure, respectively. The global information feature extraction layer, the LCS module of each level, the fully connected decision layer, and the branch expansion structure process the received feature maps in parallel, and the final scene recognition result is acquired.

FIGS. 5 to 9 show details of the scene recognition model and model training.

Embodiment 2

The core feature extraction layer includes a first-class packet multi-receptive field residual convolution module and a second-class packet multi-receptive field residual convolution module;

The first-class packet multi-receptive field residual convolution module includes a first packet, a second packet, and a third packet. Each of the first packet, the second packet, and the third packet has a different convolution size and includes a residual calculation bypass structure. Each packet outputs feature maps by convolution operation and residual calculation, and the feature maps output from each packet are spliced and channel shuffled in a channel dimension and output to the next module upon convolutional fusion.

The second-class packet multi-receptive field residual convolution module includes a fourth packet, a fifth packet, and a sixth packet. The fourth packet, the fifth packet, and the sixth packet have different convolution sizes. Each of the fifth packet and the sixth packet includes a 1×1 convolution bypass structure and a residual calculation bypass structure, respectively. Each packet outputs feature maps that are spliced and channel shuffled in the channel dimension and output to the next module upon convolutional fusion.

Figure 5:
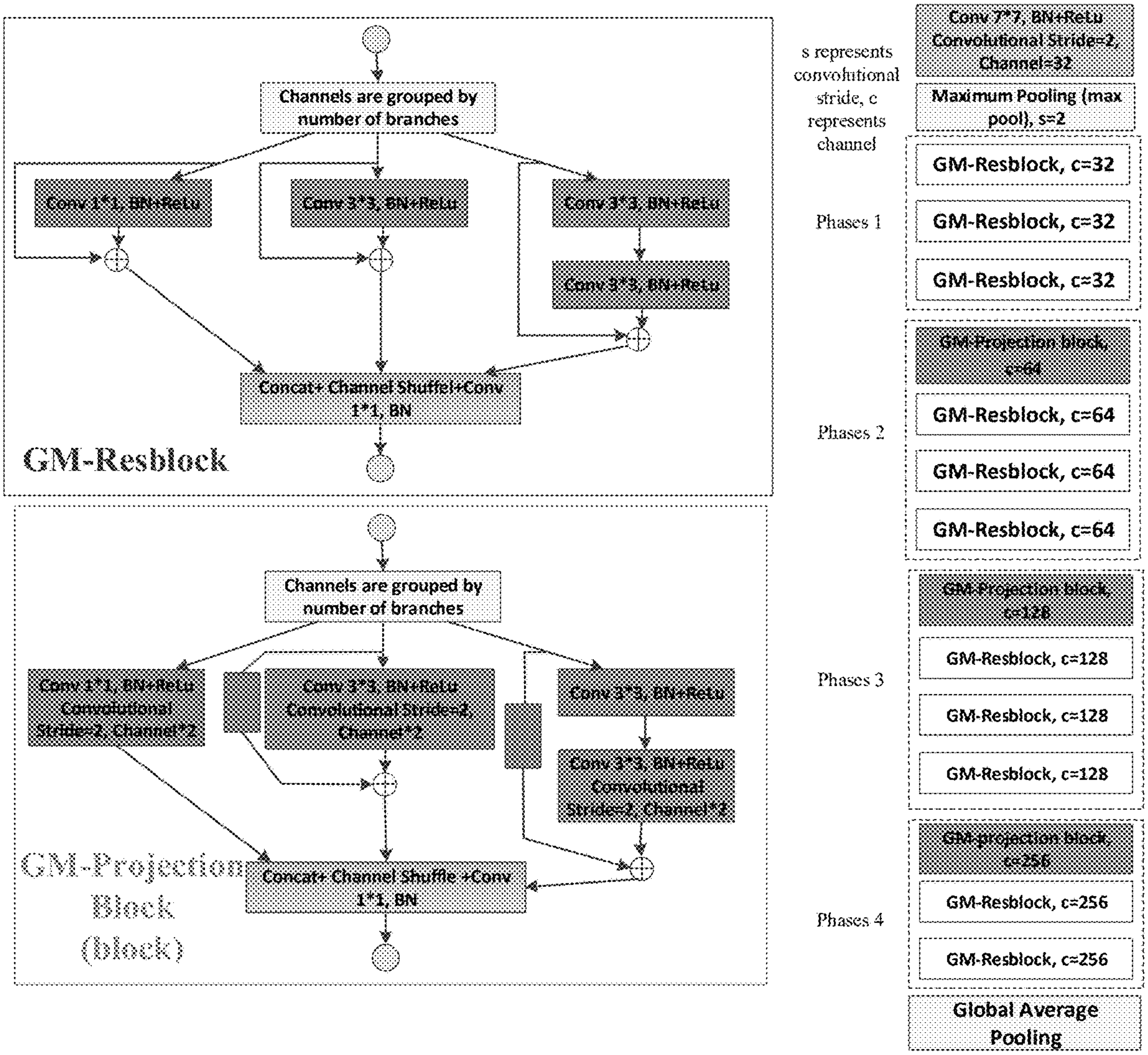
FIG. 5 is a schematic structural diagram of a core feature extraction part of a scene recognition model according to some embodiments of the present disclosure.

The scene recognition model according to the embodiments of the present disclosure has the core feature extraction layer structure as shown on the right side of FIG. 5, which consists of a series of "packet multi-receptive field residual convolution modules". The left side of FIG. 5 depicts two classes of packet multi-receptive field residual convolution modules, which consist of three convolution branches with different receptive fields. In order to save calculation, the feature map group acquired from the previous module is organized into three groups and transmitted to different convolution branches for convolution operation to further extract features. The first-class packet multi-receptive field residual convolution module is the "GM-Resblock" in FIG. 5. In order to cover different receptive fields, convolution kernels of the branches, the first packet, the second packet, and the third packet, use three different sizes, 1×1, 3×3 and 5×5, respectively, where the 5×5 convolution operation is replaced with two layers of 3×3 convolution operations, such that the number of nonlinear mappings is increased to improve the fitting ability while maintaining the same receptive field. Each branch also incorporates a bypass structure for calculating residuals, such that the gradient vanishing is avoided while expanding the depth of the model. The embodiments of the present disclosure use the multi-receptive field convolution as the module, because the scene recognition is a visually complex problem, and local features at different scales have an impact on the discrimination of scenes, and the multi-receptive field mechanism is capable of capturing as many factors, which facilitate the decision-making, as possible. In order to ensure the regularization of the number of channels, the results output from the three convolutional branches of GM-Resblock are spliced and channel shuffled in the channel dimension, and finally transmitted to the next module upon fusion using 1×1 convolution. It should be noted that the second-class packet multi-receptive field residual convolution module is the "GM projection block" in FIG. 5, which consists of the fourth packet, the fifth packet, and the sixth packet. Convolution kernels of the three branches, the fourth packet, the fifth packet, and the sixth packet, use three different dimensions, namely, 1×1, 3×3, and 5×5, respectively, where the 5×5 convolution operation is replaced with two layers of 3×3 convolution operations. The GM projection block is also configured to perform down-sampling on the feature map, and thus the structure of the GM projection block is slightly modified, such as canceling the bypass of the 1×1 convolution branch, and adding the 1×1 convolution to the bypass of the 3×3 and 5×5 convolution branches, which is configured to maintain consistency in the size of the feature map and the number of channels. In order to ensure the regularization of the number of channels, the results output from the three convolutional branches of the GM projection block are spliced and channel shuffled in the channel dimension, and finally passed to the next module upon fusion using 1×1 convolution.

Embodiment 3

Acquiring the parameters of the core feature extraction layer and global information feature extraction layer by training based on the first scene label of the sample image and standard cross-entropy loss includes:

performing up-sampling on the feature maps of different levels in the core feature extraction layer by an inverse convolution operation with different expansion factors, aligning the number of channels using a bilinear interpolation algorithm in the channel dimension, summing and merging the feature maps of each level channel-by-channel, convolving and fusing the merged feature map group, acquiring a global information feature vector by channel-by-channel global average pooling, splicing the global information feature vector and the fully connected layer FC feature vector, and acquiring the parameters of the core feature extraction layer and the global information feature extraction layer by training based on the standard cross-entropy loss.

Figure 6:
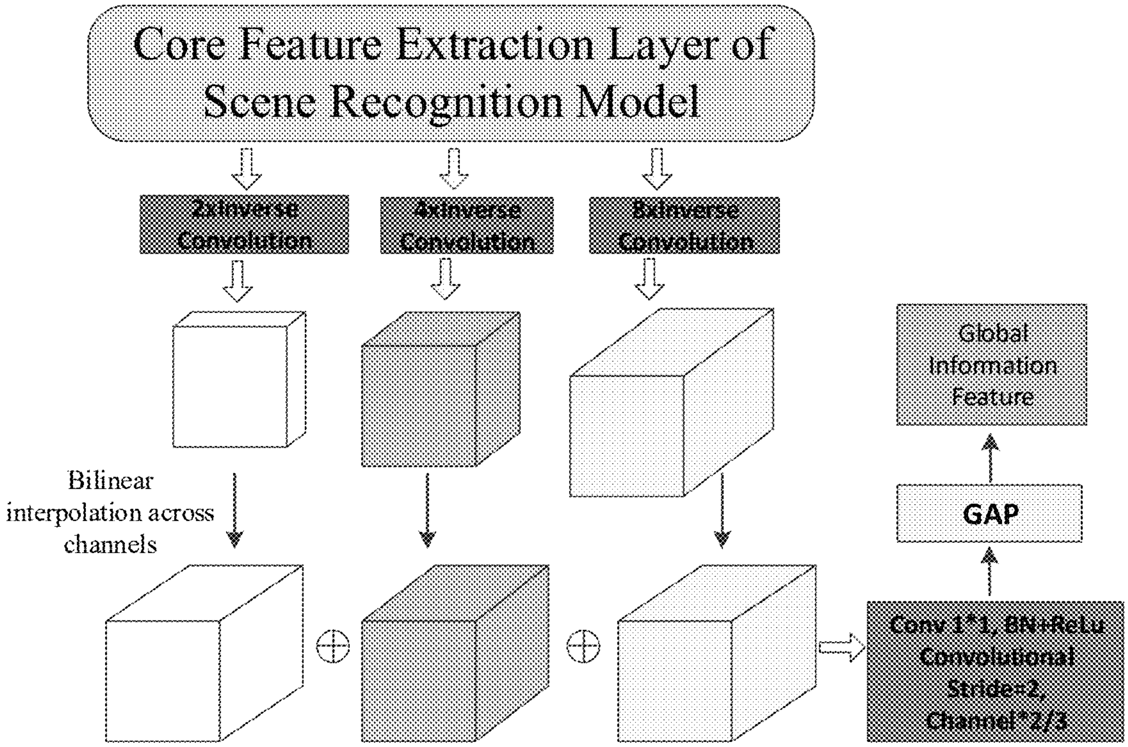
FIG. 6 is a schematic diagram of a structure and execution principles of a global information feature extraction layer according to some embodiments of the present disclosure.

In the first round of the model body training phase, a global information feature extraction module is trained along with the core feature extraction layer of the model. FIG. 6 briefly shows its details and principles. In order to extract the global information of an image, the present disclosure fuses the global information of different scales, starting from a multi-scale feature map, and acquires a high-quality global information feature vector. Compared with a single-scale global information feature, the multi-scale feature reduces information loss in one aspect, and in another aspect, makes the model more sensitive to important regions at the global spatial level. The embodiments of the present disclosure draw on the idea of a feature pyramid to up-sample the feature map groups of different levels in the core feature extraction layer of the model by using the inverse convolution operation with different expansion factors, such that the feature maps are ensured to have the same size. The main reason for using the inverse convolution instead of the normal padding up-sampling is to alleviate the image distortion problem caused by the up-sampling operation. After completing the up-sampling operation, the number of channels in different levels of feature maps is still not consistent. In this case, the insufficient channels are supplemented by simply using the bilinear interpolation algorithm circularly in the channel dimension and the number of channels is aligned. Then the feature maps of each level are merged by performing a channel-by-channel summing operation. The merged feature map group is fused using 1×1 convolution, and the global information feature vector is acquired by channel-by-channel global average pooling. According to FIG. 3, this vector is spliced with the FC feature vector that records abstract features, and then accessed with the standard cross-entropy loss for optimization.

Embodiment 4

Training the weight parameters of the LCS module of each level based on the loss value acquired by performing the pixel-by-pixel calculation on the feature map output by the LCS module of each level and the first scene label of the sample image includes:

- acquiring an importance weight of each channel by an activation function based on an attention mechanism of the channel dimension, and acquiring a summary heat map by performing a weighted summation on the feature maps of the channels according to the importance weight of each channel; and
- calculating the loss value pixel-by-pixel based on the summary heat map, an object scene association importance, and an area of the object, and training the weight parameter of the LCS module of each level based on the loss value.

Figure 7:
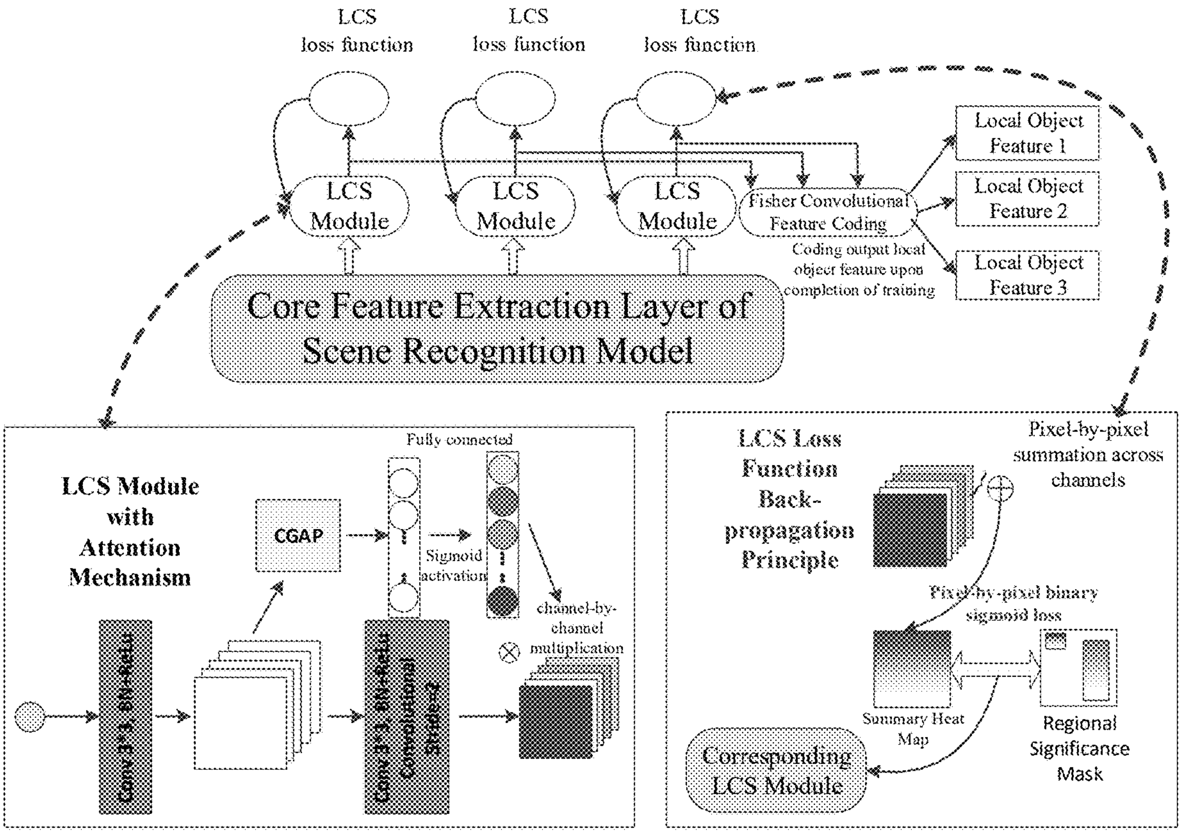
FIG. 7 is a schematic diagram of details of principles of a local supervised learning module according to some embodiments of the present disclosure.

Another important step in the model body structure part is to make the model have a good extraction capability for the local object feature as well. As shown in FIG. 7, after the first round of the model body training phase is completed, the present disclosure proposes to use a "local supervised learning module with an attention mechanism" and a "local object supervised loss" to enhance the extraction capability of this part of the model, also at multiple levels. The structure of the local supervised learning module with the attention mechanism (LCS module) is shown in the lower left of FIG. 7. Firstly, feature map groups of the levels are extracted and first mapped by 3×3 convolution and the number of channels is maintained constant. Considering that the importance of feature maps of different channels at the same pixel position is not the same, the embodiments of the present disclosure control the importance of feature maps of different channels by the attention mechanism of the channel dimension while performing size down-sampling, such that the summary heat map that more accurately indicates the pixel information at each position is acquired, which better guides the learning of local object features by the LCS module. In addition, the LCS module uses normal 3×3 convolution for down-sampling instead of the pooling operation, which is to avoid excessive activation bias of the local object during redundancy reduction. The attention mechanism of the channel dimension acquires the importance weight by using Sigmoid activation, since the importance between channels is not mutually exclusive. An importance weight vector is finally output by the fully-connected layer, and then the weighting of the channel feature maps is completed by multiplying the importance value with the corresponding channel.

Upon outputting the attention-enhanced feature map groups, the LCS module accesses the "local object supervised loss" to supervise and guide the module to learn the ability of local object feature extraction. For example, the attention-enhanced feature map groups are first summed pixel-by-pixel across channels, and a heat map reflecting activation at different pixel positions is acquired. Then, the loss is acquired by using the heat map and a mask map labeled based on a block map object and an "object-scene association importance", and back-propagated. The mask map is a label acquired, based on the image-level scene semantic label, according to an influence degree of an object in the scene image on the scene discrimination. The object in the image gives a mask according to a range of the block diagram it occupies. An object that has a large impact on the scene discrimination is labeled as “important” (a mask value is given as 1.0), a public object that has a small impact on the scene discrimination and appears in multiple scenes is labeled as “unimportant” (a mask value is given as 0.5), and a background mask value is given as 0.0. In order to achieve the effect of “local supervised learning”, the loss uses a pixel-by-pixel binary sigmoid loss, and a penalty weight is selected based on a ratio of an area of the “important object” to an area of an “unimportant object.” In a case where the area of the “important object” is much smaller than the area of the “unimportant object,” a relative gap between a penalty weight of the “important object” and that of the “unimportant object” is enlarged, such that the LCS module increases the learning effort of the “important object” when the “important object” is a small target, which avoids a bias to learning about the “unimportant object” or “background.” It should be noted that since the goal of the LCS module is to extract the local object feature, a penalty weight of “background” always takes a smaller value in both cases. The specific loss expression is as follows.

the loss of some subtle deterministic features. Therefore, the embodiments of the present disclosure reduce the dimension of the feature map by using the Fisher convolutional coding method and extract the local object feature vector by using the Fisher convolutional feature coding technique. In this way, the loss of subtle deterministic features is reduced and the effect of geometric transformation caused by the redundant features is avoided. The process of the Fisher convolutional feature coding is simple, and it mainly mixes vectors on different pixels by using a variety of general Gaussian distributions, such that the number of features of the size dimension is reduced. The steps are as follows.

The feature map is spread in the size dimension, such that it is represented as H×W C-dimensional vectors.

Each C-dimensional vector is dimensionally reduced to M-dimension by using PCA.

K Gaussian mixing parameter values are calculated by using K Gaussian distributions on the H×W M-dimensional vectors.

The H×W M-dimensional vectors are evolved into K M-dimensional Gaussian vectors.

Mean vectors and variance vectors of all the Gaussian vectors are calculated, spliced, and L2 regularized, and finally, the local object feature vector with a length of 2MK is output. Each level outputs one vector.

$$\text{LCS\_Loss} = \sum_{i=1}^{H}\sum_{j=1}^{W} l_{bsigmoid}(p_{i,j}),$$

$$l_{bsigmoid} = \begin{cases} \lambda_{im}(\text{sigmoid}(p_{i,j}) - \text{mask}_{i,j})^2, \text{ if } \text{mask}_{i,j} = 1.0 \text{ and } \dfrac{\text{mask\_area}_{im}}{\text{mask\_area}_{unim}} > T_{area}, \\ \lambda_{unim}(\text{sigmoid}(p_{i,j}) - \text{mask}_{i,j})^2, \text{ if } \text{mask}_{i,j} = 0.5 \text{ and } \dfrac{\text{mask\_area}_{im}}{\text{mask\_area}_{unim}} > T_{area}, \\ \lambda_{back}(\text{sigmoid}(p_{i,j}) - \text{mask}_{i,j})^2, \text{ if } \text{mask}_{i,j} = 0.0 \text{ and } \dfrac{\text{mask\_area}_{im}}{\text{mask\_area}_{unim}} > T_{area} \end{cases}$$

$$l_{bsigmoid} = \begin{cases} \lambda'_{im}(\text{sigmoid}(p_{i,j}) - \text{mask}_{i,j})^2, \text{ if } \text{mask}_{i,j} = 1.0 \text{ and } \dfrac{\text{mask\_area}_{im}}{\text{mask\_area}_{unim}} > T_{area}, \\ \lambda'_{unim}(\text{sigmoid}(p_{i,j}) - \text{mask}_{i,j})^2, \text{ if } \text{mask}_{i,j} = 0.5 \text{ and } \dfrac{\text{mask\_area}_{im}}{\text{mask\_area}_{unim}} > T_{area}, \\ \lambda'_{back}(\text{sigmoid}(p_{i,j}) - \text{mask}_{i,j})^2, \text{ if } \text{mask}_{i,j} = 0.0 \text{ and } \dfrac{\text{mask\_area}_{im}}{\text{mask\_area}_{unim}} > T_{area} \end{cases}$$

$P_{i,j}$ represents an activation value of a pixel on the heat map, $\text{mask}_{i,j}$ represents a pixel-level label, and area represents an area. In the present disclosure, $\lambda_{im}$, $\lambda_{unim}$, $\lambda'_{im}$, $\lambda'_{unim}$, and $\lambda_{back}$ take the values of 0.8, 0.6, 1.0, 0.5, 0.3, respectively. It should be noted that in the present disclosure, in training the LCS module, the module of each level is directly connected to the loss, back-propagated alone, and the mask map performs down-sampling accordingly as needed.

H and W represent a height and a width of an image, i and j represent a row number and a column number of a pixel, $l_{bsigmoid}$ represents a calculation method a loss value corresponding to each pixel, $T_{area}$ represents a threshold that triggers different calculation methods of loss values, $\text{mask\_area}_{im}$ represents an area of a mask region of an important object, and $\text{mask\_area}_{unim}$ represents an area of a mask region of a normal object. The $\text{mask\_area}_{im}$ and the $\text{mask\_area}_{unim}$ are artificially labeled.

After the LCS module completes the training, the features directly extracted by the module are still feature map groups with a size of H×W×C, which still has large redundancy when used directly as the feature, while using a non-linear fully-connected layer to extract the feature vectors results in The difference between here and the global information feature extraction is that in order to acquire some subtle local object features, the features of different levels are no longer fused, but are output separately. As shown in step 3 of FIG. 3, after the local object features and global information features are acquired, these features are also combined with the FC abstract features to reconstruct a body decision layer oriented to high-richness features, and the high precision decision is completed by using these features.

Embodiment 5

The branch expansion structure is constructed using a depth-wise separable convolutional residual block DW. In a main path of the residual block, a DW convolutional layer is used as a middle layer, and a 1×1 convolutional layer is used before and after the DW convolution.

The local object association relationship learning module includes a deformable convolutional layer, a convolutional layer, and an average pooling layer.

The deformable convolution layer acquires a convolution kernel offset value of a current pixel position, acquires a real effective position of a convolution kernel parameter by adding the current position of the convolution kernel parameter to the offset value, acquires a feature image pixel value of the real effective position, and outputs the feature map after the convolution operation and average pooling operation.

Figure 8:
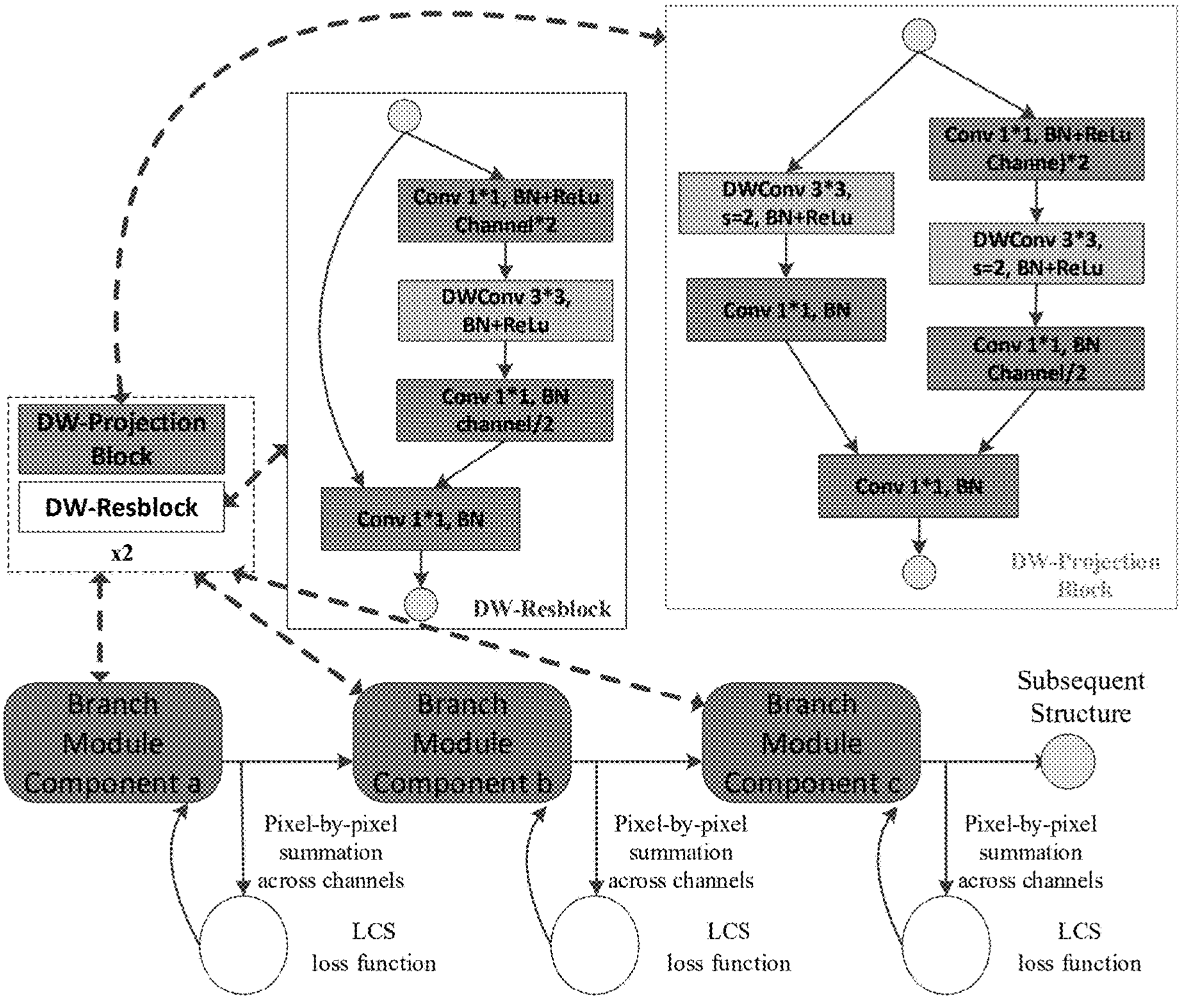
FIG. 8 is a schematic diagram of a structure and training principles of a first round of an expansion branch network of a scene recognition model according to some embodiments of the present disclosure.
Figure 9:
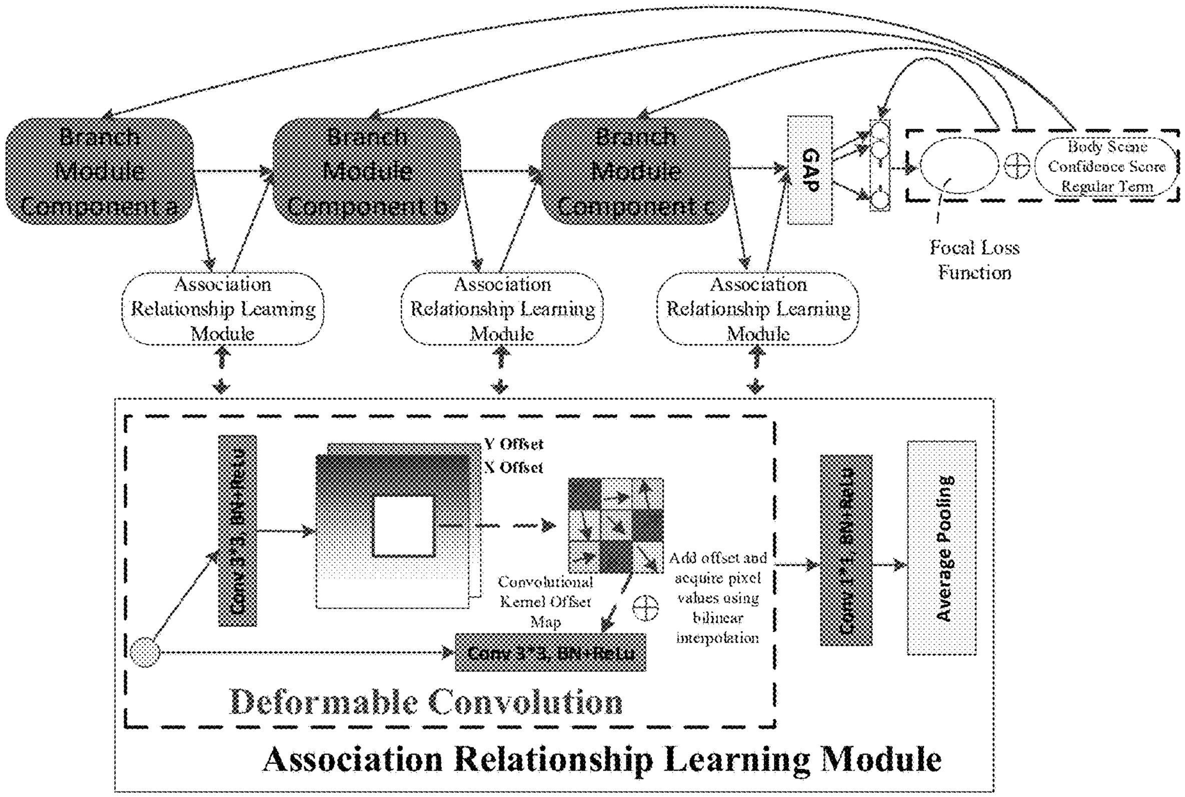
FIG. 9 is a schematic diagram of a structure and training of a branch expansion phase of a scene recognition model according to some embodiments of the present disclosure.

After completing the training of the model body, the branch expansion phase is entered. Branches are usually expanded according to new fine-grained scene requirements, and a suitable network structure is used to design new branches according to the requirements. Embodiments of the present disclosure consider the multiple expandability of branches, and in order to control the overhead of each branch, a depth-wise separable convolutional residual block (DW) is used to construct branches, as shown in FIG. 8. In the main path of the residual block, the middle layer uses DW convolution to replace the normal convolutional layer, which reduces the calculation overhead by about two-thirds. The 1×1 convolution is used before and after the DW convolution to achieve the inverse channel shrinkage operation while the output is activated by linear activation, which is mainly to prevent Relu from discarding too many features when activated by negative values. The present disclosure ultimately uses three modules (a branch module component a, a branch module component b, and a branch module component c) concatenated together to form a fine-grained branch. The branch is acquired by expanding the core feature extraction layer of the scene model body, which is not specifically optimized for the local object feature learning capability. Therefore, the corresponding level of the expansion branch network is directly connected to the previously proposed LCS loss for pre-training optimization, which is different from the training of the body part, and does not add an additional LCS module, but instead uses the parameter of the convolutional layer shared with the expansion branch network. This is to reduce the overhead in one aspect, and in another aspect, in the second training round of the branch expansion phase, based on the local object feature extraction, learn the association relationship of local objects, and achieve the recognition of fine-grained complex scenes combined with the local object features and global spatial association of local objects.

In order to gain the ability to learn the association relationship based on the ability of local object feature extraction, the present disclosure embeds an "association relationship learning module" between the components of each branch module in the second round of the branch expansion phase, and these modules are trained together with the components of the original branch network. As shown in the lower side of FIG. 9, the association relationship learning module consists of a deformable convolutional layer, a 1×1 convolutional layer, and an average pooling layer. The deformable convolutional layer is a core of the module, which uses a deformed convolutional kernel in performing the convolution operation, mainly because the global spatial association of the local object is generally not in a regular geometrical shape, and the association logic is more accurately modeled by the deformed convolutional kernel. The process of deformable convolution is very simple, it needs to acquire a convolution kernel offset of a current pixel position by a branch before performing the convolution operation, wherein the offset includes an X offset and a Y offset (because the convolution kernel parameter usually only needs to focus on the size dimension), and then the current position of the convolution kernel parameter is added with the offset value as its real effective position. Considering that the coordinates of this position may be a floating-point number, so the feature image pixel value of the corresponding position of the convolution kernel parameter is acquired by bilinear interpolation. After completing the deformable convolution operation, a 1×1 convolution operation and an average pooling operation (non-global average pooling without changing the size) are also performed, which is mainly used to smooth the output result. It should be noted that the association relationship learning module is merely a bypass of the branch expansion network join position, and the original modules are still directly connected to each other. In this round of training, since it focuses on fine-grained scenarios in general, this is more prone to data category imbalance and cross-category feature overlap. Therefore, this round of training uses focal loss as the main part of the loss function, this kind of loss gives more training attention to a category with a smaller number, and it is also well suited as a multi-label training loss. In addition, the present disclosure also uses the confidence of each scenario in the body part as a regular term to improve the efficiency of this round of training. The format of the loss function is as follows.

$$L_{branch} = L_{focus} + \sum_{i=1}^{Num_{calss}} C_{score}^{i} R$$

$L_{focus}$ represents a standard focus loss, $$C_{score}^{i}$$

represents a confidence score of the image in the body part for a certain scene category i, R is a regular term, and the present disclosure uses the L2 regular term as a penalty term for the expansion. The branch expansion is performed at any level of the body recognition feature extraction layer and expanded in a tree-like manner.

$Num_{class}$ represents the number of classes.

The embodiments of the present disclosure achieve the following beneficial effects.

The present disclosure trains the model body feature extraction part from these perspectives, namely, abstract features, global information features, and local object features using a three-phase training scheme, such that the model has the ability to extract high-richness features and is capable of making scene discrimination based on them, and thus the scene recognition accuracy is improved.

The present disclosure combines the idea of a feature pyramid to mine the global information features from multiple scales. In this way, the loss of global spatial correlation information caused by excessive down-sampling and nonlinear transformation is avoided, high-quality global information features are provided, and the ability to recognize the background scenes is improved.

The present disclosure provides a local object feature extraction capability for different levels by local supervised learning at multiple levels, which reduces the loss of subtle scene decision information and enriches the local object features compared to local object feature extraction at a single level.

The present disclosure enhances the attention degree of the local supervised learning module to different channels by an attention mechanism, strengthens the activation of important local object features, and gives direction to subsequent Fisher coding.

The present disclosure proposes for the first time using a new pixel-by-pixel binary sigmoid loss for optimization based on the summary heat map, combined with the importance of local objects at the block diagram level, such that the local supervised learning module is forced to focus on the learning of the "important local objects" and reduce the interference of the "unimportant local objects" and "background" in decision making.

The present disclosure extracts feature vectors from the feature map using Fisher convolutional coding, which reduces redundancy while avoiding over-abstraction and loss of information.

In the body training phase, in order to increase the richness of the features, the present application uses multi-branch residual convolution as the basic module, which ensures the feature extraction capability, while in the model branch expansion phase, the present application reduces the overhead by using strategies such as depth-wise separable convolution and sharing the local learning module.

The present disclosure proposes for the first time building the association relationship learning module using the deformable convolution, which uses the geometric flexibility of the deformable convolution to accurately model the association relationship of the local objects.

The present disclosure also well optimizes the fine-grained scene recognition with class imbalance using the scene confidence of the body part as the regular term, combined with focus loss.

The first round of the model body training phase only fully trains the core feature extraction layer by using the focal loss, and then the global information feature extraction module is trained separately.

The global information feature extraction module uses two layers of inverse convolution alone for both size up-sampling and channel expansion, which, however, slows down the convergence.

The global information feature extraction module achieves feature fusion by using a channel-level attention mechanism and a fully connected layer.

The local supervised learning module is trained with the fully connected layer by using the image-level semantic label combined with auxiliary loss.

The fine-grained branch expansion network is expanded on the existing branch expansion network without using the body network as the starting point for expansion.

The model body part also reduces the overhead by using a base module based on depth-wise separable convolution, while the n×n convolution is also converted to equivalent 1×n and n×1 convolutions to reduce the overhead.

It is possible to train the association relationship learning alone at multiple levels by designing a specialized loss function, with no need to mix the association relationship learning together in the branch expansion network for training.

Embodiment 6

Figure 10:
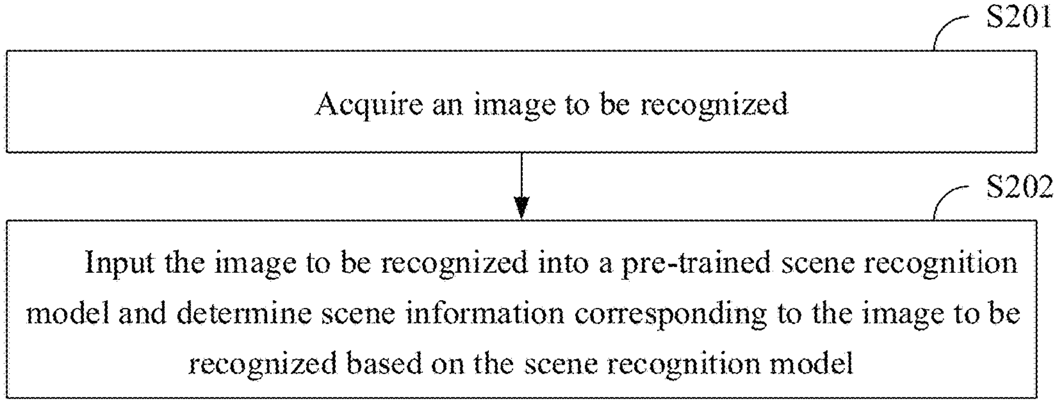
FIG. 10 is a schematic diagram of a scene recognition process according to some embodiments of the present disclosure.

FIG. 10 is a schematic diagram of a scene recognition process according to some embodiments of the present disclosure. The process includes the following steps.

In S201, an image to be recognized is acquired.

In S202, the image to be recognized is input into a pre-trained scene recognition model, and scene information corresponding to the image to be recognized is determined based on the scene recognition model.

The scene recognition method according to some embodiments of the present disclosure is applied to an electronic device, which is a smart device such as a PC, a tablet, or a server. The electronic device that performs the scene recognition is the same as or different from the electronic device that performs the model training in the above embodiments.

The process of model training is generally offline. Therefore, in a case where the electronic device for model training trains the model by the method in the above embodiment, the trained scene recognition model is directly saved in the electronic device for scene recognition, such that the electronic device for subsequent scene recognition is capable of directly performing corresponding processing by the trained scene recognition model.

In some embodiments of the present disclosure, the image input into the scene recognition model for processing is treated as the image to be recognized. In the case that the image to be recognized is acquired, the image to be recognized is input into the pre-trained scene recognition model, and the scene information corresponding to the image to be recognized is determined based on the scene recognition model.

Embodiment 7

Figure 11:
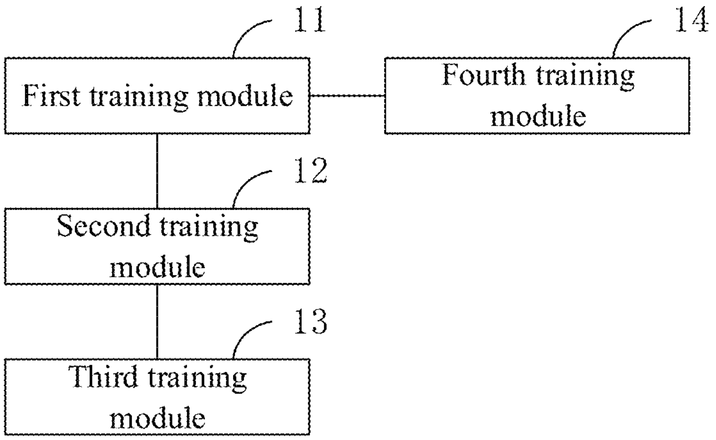
FIG. 11 is a schematic structural diagram of an apparatus for training a scene recognition model according to some embodiments of the present disclosure.

FIG. 11 is a schematic structural diagram of an apparatus for training a scene recognition model according to some embodiments of the present disclosure. The apparatus includes:

- a first training unit 11, configured to acquire parameters of a core feature extraction layer and a global information feature extraction layer by training based on a first scene label of a sample image and a standard cross-entropy loss;
- a second training unit 12, configured to train a weight parameter of an LCS module of each level based on a loss value acquired by performing a pixel-by-pixel calculation on a feature map output from the LCS module of each level and the first scene label of the sample image; and
- a third training unit 13, configured to acquire a parameter of a fully connected decision layer by training based on the first scene label of the sample image and standard cross-entropy losses.

The apparatus further includes:

- a fourth training unit 14, configured to train, based on a loss value acquired by performing a pixel-by-pixel calculation on a feature map output from a convolutional layer of a branch expansion structure and a second scene label of the sample image, a weight parameter of the convolutional layer of each level of the branch expansion structure; and acquire a parameter of a local object association relationship learning module by training based on a loss function with a scene confidence regularization term. The first scene label and the second scene label have different granularities.

The first training unit 11 is further configured to perform up-sampling on the feature maps of different levels in the core feature extraction layer by an inverse convolution operation with different expansion factors, align the number of channels using a bilinear interpolation algorithm in a channel dimension, sum and merge the feature maps of the various levels channel-by-channel, convolve and fuse the merged feature map group, acquire a global information feature vector by performing channel-by-channel global average pooling, splice the global information feature vector with a fully connected layer FC feature vector, and acquire the parameters of the core feature extraction layer and global information feature extraction layer by training based on the standard cross-entropy loss.

The second training unit 12 is further configured to acquire an importance weight of each channel by using an activation function based on an attention mechanism of the channel dimension, and acquire a summary heat map by performing a weighted summation on the feature maps of the respective channels according to the importance weights of the respective channels; and calculate a loss value pixel-by-pixel according to the summary heat map, an object scene association importance, and an area of the object, and train the weight parameter of the LCS module of each level according to the loss value.

Embodiment 8

Figure 12:
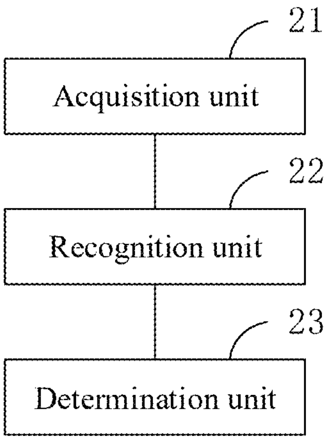
FIG. 12 is a schematic structural diagram of a scene recognition apparatus according to some embodiments of the present disclosure.

FIG. 12 is a schematic structural diagram of a scene recognition apparatus according to some embodiments of the present disclosure. The apparatus includes:

an acquisition unit 21, configured to acquire an image to be recognized; and a recognition unit 22, configured to input the image to be recognized into a pre-trained scene recognition model and determine scene information corresponding to the image to be recognized based on the scene recognition model.

The apparatus further includes:

a determination unit 23, configured to determine, in response to a scenario where the determined scene information corresponding to the to-be-recognized image belongs to offensive scene information and a moderation result of a machine moderation is that the to-be-recognized image is an offensive image, the to-be-recognized image to be an offensive image.

Embodiment 9

Figure 13:
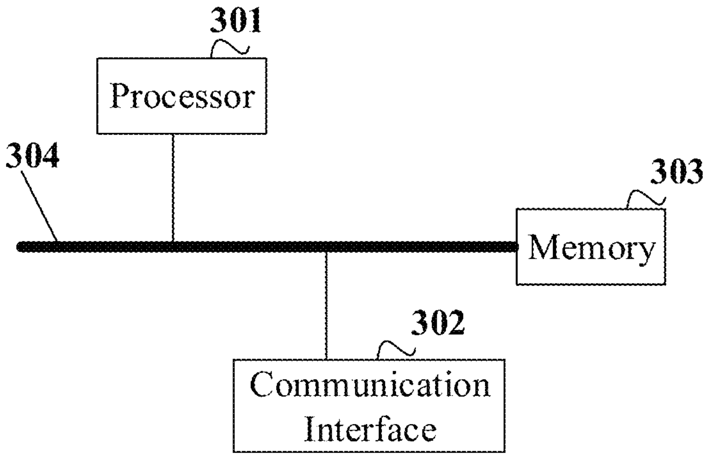
FIG. 13 is a schematic structural diagram of an electronic device according to some embodiments of the present disclosure.

Based on the above embodiments, some embodiments of the present disclosure further provide an electronic device. As shown in FIG. 13, the electronic device includes a processor 301, a communication interface 302, a memory 303, and a communication bus 304. The processor 301, the communication interface 302, and the memory 303 are communicated with each other by the communication bus 304.

The memory 303 has one or more computer programs stored therein. The one or more programs, when loaded and executed by the processor 301, cause the processor 301 to perform:

acquiring parameters of a core feature extraction layer and a global information feature extraction layer by training based on a first scene label of a sample image and a standard cross-entropy loss;

training a weight parameter of an LCS module of each level based on a loss value acquired by performing a pixel-by-pixel calculation on a feature map output from the LCS module of each level and the first scene label of the sample image; and acquiring a parameter of a fully-connected decision layer by training based on the first scene label of the sample image and the standard cross-entropy loss.

Based on the same inventive concept, an electronic device is also provided by some embodiments of the present disclosure. The principles of problem solving of the electronic device are similar to those of the training method of the scene recognition model, and thus for implementation of the electronic device, reference is made to the implementation of the method, which is not repeated herein.

Embodiment 10

Figure 14:
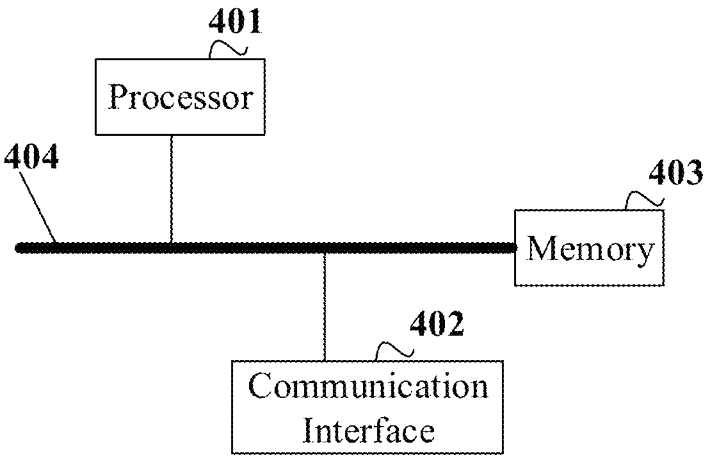
FIG. 14 is a schematic structural diagram of another electronic device according to some embodiments of the present disclosure.

Based on the above embodiments, some embodiments of the present disclosure further provide an electronic device. As shown in FIG. 14, the electronic device includes a processor 401, a communication interface 402, a memory 403, and a communication bus 404. The processor 401, the communication interface 402, and the memory 403 are communicated with each other by the communication bus 404.

The memory 403 has one or more computer programs stored therein. The one or more programs, when loaded and executed by the processor 301, cause the processor 401 to perform:

acquiring an image to be recognized; and inputting the image to be recognized into a pre-trained scene recognition model, and determining scene information corresponding to the image to be recognized based on the scene recognition model.

Based on the same inventive concept, an electronic device is also provided by some embodiments of the present disclosure. The principles of problem solving of the electronic device are similar to those of the scene recognition method, and thus for implementation of the electronic device, reference is made to the implementation of the method, which is not repeated herein.

Embodiment 11

Based on the above embodiments, some embodiments of the present disclosure further provide a computer-readable storage medium, storing one or more computer programs executable by an electronic device therein, such that the one or more programs, when loaded and run on the electronic device, cause the electronic device to perform:

acquiring parameters of a core feature extraction layer and a global information feature extraction layer by training based on a first scene label of a sample image and a standard cross-entropy loss;

training a weight parameter of an LCS module of each level based on a loss value acquired by performing a pixel-by-pixel calculation on a feature map output from the LCS module of each level and the first scene label of the sample image; and acquiring a parameter of a fully-connected decision layer by training based on the first scene label of the sample image and the standard cross-entropy loss.

Based on the same inventive concept, a computer-readable storage medium is also provided by the embodiments of the present disclosure. The principles of the problem solving by the processor in performing the computer programs stored in the computer-readable storage medium are similar to those of the training method of the scene recognition model, and thus for the implementation of the processor in performing the computer programs stored in the computer-readable storage medium, reference is made to the implementation of the method, which is not repeated herein.

Embodiment 12

Based on the above embodiments, some embodiments of the present disclosure further provide a computer-readable storage medium, storing one or more computer programs executable by an electronic device therein, such that the one or more programs, when loaded and run on the electronic device, cause the electronic device to perform:

acquiring an image to be recognized; and inputting the image to be recognized into a pre-trained scene recognition model, and determining scene information corresponding to the image to be recognized based on the scene recognition model.

Based on the same inventive concept, some embodiments of the present disclosure further provide a computer-readable storage medium. The principles of the problem solving by the processor in performing the computer programs stored in the computer-readable storage medium are similar to those of the scene recognition method, and thus for the implementation of the processor in performing the computer programs stored in the computer-readable storage medium, reference is made to the implementation of the method, which is not repeated herein.

Embodiments of the present disclosure provide a model training and scene recognition method, an apparatus, a device, and a medium, providing a scene recognition solution with high accuracy.

The present disclosure is described with reference to flowcharts and/or block diagrams of methods, devices (systems), and computer program products according to the embodiments of the present disclosure. It should be understood that each of the processes and/or blocks in the flowchart and/or block diagram, and the combination of processes and/or blocks in the flowchart and/or block diagram, may be implemented by computer program instructions. These computer program instructions may be provided to a processor of a general-purpose computer, a special-purpose computer, an embedded processor, or another programmable data-processing device to produce a machine such that the instructions executed by the processor of the computer or other programmable data-processing device produce a device for carrying out the functions specified in the process or processes of the flowchart and/or the box or boxes of the block diagram.

These computer program instructions may also be stored in the computer-readable memory capable of directing the computer or other programmable data processing device to operate in a particular manner, such that the instructions stored in the computer-readable memory produce an article including an instruction device. The instruction device implements the function specified in the one process or a plurality of processes of the flowchart and/or one block or a plurality of blocks of the block diagram These computer program instructions may also be loaded onto a computer or other programmable data processing device, such that a series of operational steps are performed on the computer or other programmable device to produce computer-implemented processing. In this way, the instructions executed on the computer or other programmable device provide steps for implementing the functions specified in one process or a plurality of processes of the flowchart and/or one block or a plurality of blocks of the block diagram.

Although some embodiments of the present disclosure have been described, those skilled in the art may make additional changes and modifications to these embodiments once the underlying inventive concepts are known. Therefore, the appended claims are intended to be construed to include several embodiments as well as all changes and modifications that fall within the scope of this disclosure.

Those skilled in the art may make various changes and variations to the present disclosure without departing from the spirit and scope of the present disclosure. Thus, if such modifications and variations of the present disclosure fall within the scope of the claims of the present disclosure and its technical equivalents, the present disclosure is intended to encompass those changes and variations as well.

The invention claimed is:

1. A method for training a scene recognition model, the scene recognition model comprising a core feature extraction layer, a global information feature extraction layer connected to the core feature extraction layer, a local supervised learning (LCS) module of at least one level with an attention mechanism, and a fully-connected decision layer;

wherein the method comprises:

acquiring parameters of the core feature extraction layer and the global information feature extraction layer by training based on a first scene label of a sample image and a standard cross-entropy loss;

training a weight parameter of the LCS module of each level, based on a loss value acquired by performing a pixel-by-pixel calculation on a feature map output from the LCS module of each level and the first scene label of the sample image; and acquiring a parameter of the fully-connected decision layer by training based on the first scene label of the sample image and the standard cross-entropy loss;

wherein training the weight parameter of the LCS module of each level based on the loss value acquired by performing the pixel-by-pixel calculation on the feature map output from the LCS module of each level and the first scene label of the sample image comprises:

acquiring an importance weight of each channel using an activation function by an attention mechanism of a channel dimension;

acquiring a summary heat map by performing a weighted summation on the feature maps of the channels based on the importance weight of each channel;

calculating the loss value pixel-by-pixel based on the summary heat map, an object scene association importance, and an area of an object; and training the weight parameter of the LCS module of each level based on the loss value.

2. The method according to claim 1, wherein the scene recognition model further comprises a branch expansion structure, the branch expansion structure comprising a convolutional layer and a local object association relationship learning module; and the method further comprises:

training a weight parameter of a convolutional layer of at least one level of the branch expansion structure, based on a loss value acquired by performing a pixel-by-pixel calculation on a feature map output from a convolutional layer of the branch expansion structure and a second scene label of the sample image; and acquiring a parameter of the local object association relationship learning module by training based on a loss function with a scene confidence regularization term, wherein the first scene label and the second scene label have different granularities.

3. The method according to claim 1, wherein the core feature extraction layer comprises a first-class packet multi-receptive field residual convolution module and a second-class packet multi-receptive field residual convolution module; wherein the first-class packet multi-receptive field residual convolution module comprises a first packet, a second packet, and a third packet, wherein the first packet, the second packet, and the third packet have different convolution sizes, each of the first packet, the second packet, and the third packet comprises a residual calculation bypass structure, and each of the packets outputs a feature map by a convolution operation and a residual calculation, the feature map output from each of the packets being spliced and channel shuffled in a channel dimension and output to a next module upon convolutional fusion; and the second-class packet multi-receptive field residual convolution module comprises a fourth packet, a fifth packet, and a sixth packet, wherein the fourth packet, the fifth packet, and the sixth packet have different convolution sizes, and each of the fifth packet and the sixth packet comprises a 1×1 convolution bypass structure and a residual calculation bypass structure, a feature map output from each of the packets being spliced and channel shuffled in the channel dimension and output to a next module upon convolutional fusion.

4. The method according to claim 1, wherein acquiring the parameters of the core feature extraction layer and the global information feature extraction layer by training based on the first scene label of the sample image and the standard cross-entropy loss comprises:

up-sampling feature maps of different levels in the core feature extraction layer by an inverse convolution operation with different expansion factors;

aligning the number of channels using a bilinear interpolation algorithm in a channel dimension;

summing and merging the feature map of at least one level channel-by-channel;

convolving and fusing the merged feature map group;

acquiring a global information feature vector by channel-by-channel global average pooling;

splicing the global information feature vector and a fully-connected layer FC feature vector; and acquiring the parameters of the core feature extraction layer and the global information feature extraction layer by training based on the standard cross-entropy loss.

5. The method according to claim 2, wherein the branch expansion structure is constructed by using a depth-wise separable convolutional residual block DW, in a main path of the residual block, a DW convolutional layer is used as a middle layer, and a 1×1 convolutional layer is used before and after the DW convolutional layer.

6. The method according to claim 2, wherein the local object association relationship learning module comprises a deformable convolutional layer, a convolutional layer, and an average pooling layer; wherein the deformable convolution layer acquires a convolution kernel offset value of a current pixel position, a real effective position of a convolution kernel parameter is acquired by adding a current position of the convolution kernel parameter to the offset value, a feature image pixel value of the real effective position is acquired, and a feature map is output after a convolution operation and an average pooling operation.

7. A scene recognition method for a scene recognition model acquired by training according to the method as defined in claim 1, the method comprising:

acquiring an image to be recognized; and inputting the image to be recognized into a pre-trained scene recognition model and determining scene information corresponding to the image to be recognized based on the scene recognition model.

8. The method according to claim 7, further comprising:

in response to a scenario where the determined scene information corresponding to the image to be recognized belongs to offensive scene information and a moderation result of a machine moderation is that the image to be recognized is an offensive image, determining the image to be recognized to be an offensive image.

9. An electronic device for training a scene recognition model, comprising: a processor and a memory, the memory storing one or more computer programs therein, wherein the scene recognition model comprises a core feature extraction layer, a global information feature extraction layer connected to the core feature extraction layer, a local supervised learning (LCS) module of at least one level with an attention mechanism, and a fully-connected decision layer; and the processor, when loading and running the one or more computer programs stored in the memory, is caused to perform:

acquiring parameters of the core feature extraction layer and the global information feature extraction layer by training based on a first scene label of a sample image and a standard cross-entropy loss;

training a weight parameter of the LCS module of each level, based on a loss value acquired by performing a pixel-by-pixel calculation on a feature map output from the LCS module of each level and the first scene label of the sample image; and acquiring a parameter of the fully-connected decision layer by training based on the first scene label of the sample image and the standard cross-entropy loss;

wherein the processor, when loading and running the one or more computer programs stored in the memory, is caused to perform:

acquiring an importance weight of each channel using an activation function by an attention mechanism of a channel dimension;

acquiring a summary heat map by performing a weighted summation on the feature maps of the channels based on the importance weight of each channel;

calculating the loss value pixel-by-pixel based on the summary heat map, an object scene association importance, and an area of an object; and training the weight parameter of the LCS module of each level based on the loss value.

10. A non-transitory computer-readable storage medium for training a scene recognition model, storing one or more computer programs therein, wherein the scene recognition model comprises a core feature extraction layer, a global information feature extraction layer connected to the core feature extraction layer, a local supervised learning (LCS) module of at least one level with an attention mechanism, and a fully-connected decision layer; and the one or more computer programs, when loaded and run by a processor, cause the processor to perform:

acquiring parameters of the core feature extraction layer and the global information feature extraction layer by training based on a first scene label of a sample image and a standard cross-entropy loss;

training a weight parameter of the LCS module of each level, based on a loss value acquired by performing a pixel-by-pixel calculation on a feature map output from the LCS module of each level and the first scene label of the sample image; and acquiring a parameter of the fully-connected decision layer by training based on the first scene label of the sample image and the standard cross-entropy loss;

wherein the one or more computer programs, when loaded and run by the processor, cause the processor to perform:

acquiring an importance weight of each channel using an activation function by an attention mechanism of a channel dimension;

acquiring a summary heat map by performing a weighted summation on the feature maps of the channels based on the importance weight of each channel;

calculating the loss value pixel-by-pixel based on the summary heat map, an object scene association importance, and an area of an object; and training the weight parameter of the LCS module of each level based on the loss value.

11. An electronic device for recognizing scenes, comprising: a processor and a memory, the memory storing one or more computer programs therein, wherein the processor, when loading and running the one or more computer programs stored in the memory, is caused to perform the steps of the scene recognition method as defined in claim 7.

12. A non-transitory computer-readable storage medium for recognizing scenes, storing one or more computer programs therein, wherein the one or more computer programs, when loaded and run by a processor, cause the processor to perform the steps of the scene recognition method as defined in claim 7.

13. The electronic device according to claim 9, wherein the scene recognition model further comprises a branch expansion structure, the branch expansion structure comprising a convolutional layer and a local object association relationship learning module; and the processor, when loading and running the one or more computer programs stored in the memory, is caused to perform:

training a weight parameter of a convolutional layer of at least one level of the branch expansion structure, based on a loss value acquired by performing a pixel-by-pixel calculation on a feature map output from a convolutional layer of the branch expansion structure and a second scene label of the sample image; and acquiring a parameter of the local object association relationship learning module by training based on a loss function with a scene confidence regularization term, wherein the first scene label and the second scene label have different granularities.

14. The electronic device according to claim 9, wherein the core feature extraction layer comprises a first-class packet multi-receptive field residual convolution module and a second-class packet multi-receptive field residual convolution module; wherein the first-class packet multi-receptive field residual convolution module comprises a first packet, a second packet, and a third packet, wherein the first packet, the second packet, and the third packet have different convolution sizes, each of the first packet, the second packet, and the third packet comprises a residual calculation bypass structure, and each of the packets outputs a feature map by a convolution operation and a residual calculation, the feature map output from each of the packets being spliced and channel shuffled in a channel dimension and output to a next module upon convolutional fusion; and the second-class packet multi-receptive field residual convolution module comprises a fourth packet, a fifth packet, and a sixth packet, wherein the fourth packet, the fifth packet, and the sixth packet have different convolution sizes, and each of the fifth packet and the sixth packet comprises a 1×1 convolution bypass structure and a residual calculation bypass structure, a feature map output from each of the packets being spliced and channel shuffled in the channel dimension and output to a next module upon convolutional fusion.

15. The electronic device according to claim 9, wherein the processor, when loading and running the one or more computer programs stored in the memory, is caused to perform:

up-sampling feature maps of different levels in the core feature extraction layer by an inverse convolution operation with different expansion factors;

aligning the number of channels using a bilinear interpolation algorithm in a channel dimension;

summing and merging the feature map of at least one level channel-by-channel;

convolving and fusing the merged feature map group;

acquiring a global information feature vector by channel-by-channel global average pooling;

splicing the global information feature vector and a fully-connected layer FC feature vector; and acquiring the parameters of the core feature extraction layer and the global information feature extraction layer by training based on the standard cross-entropy loss.

16. The electronic device according to claim 13, wherein the branch expansion structure is constructed by using a depth-wise separable convolutional residual block DW, in a main path of the residual block, a DW convolutional layer is used as a middle layer, and a 1×1 convolutional layer is used before and after the DW convolutional layer.

17. The electronic device according to claim 13, the local object association relationship learning module comprises a deformable convolutional layer, a convolutional layer, and an average pooling layer; wherein the deformable convolution layer acquires a convolution kernel offset value of a current pixel position, a real effective position of a convolution kernel parameter is acquired by adding a current position of the convolution kernel parameter to the offset value, a feature image pixel value of the real effective position is acquired, and a feature map is output after a convolution operation and an average pooling operation.

18. The non-transitory computer-readable storage medium according to claim 10, wherein the scene recognition model further comprises a branch expansion structure, the branch expansion structure comprising a convolutional layer and a local object association relationship learning module; and the one or more computer programs, when loaded and run by a processor, cause the processor to perform:

training a weight parameter of a convolutional layer of at least one level of the branch expansion structure, based on a loss value acquired by performing a pixel-by-pixel calculation on a feature map output from a convolutional layer of the branch expansion structure and a second scene label of the sample image; and acquiring a parameter of the local object association relationship learning module by training based on a loss function with a scene confidence regularization term, wherein the first scene label and the second scene label have different granularities.

* * * * *